BACKWARD-WAVE PARAMETRIC AMPLIFIERS WITH WIDE-BAND TUNING
Filed Aug. 14, 1961 4 Sheets-Sheet 1
FIG. 1a
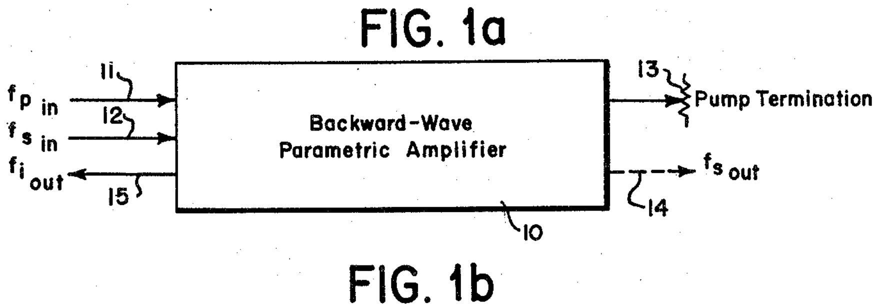
FIG. 1b
| Group Velocity Vg | Phase Velocity Vf | Frequency |
|---|---|---|
| → | → | Signal |
| ← | ← | Idler |
| → | ← | Pump |
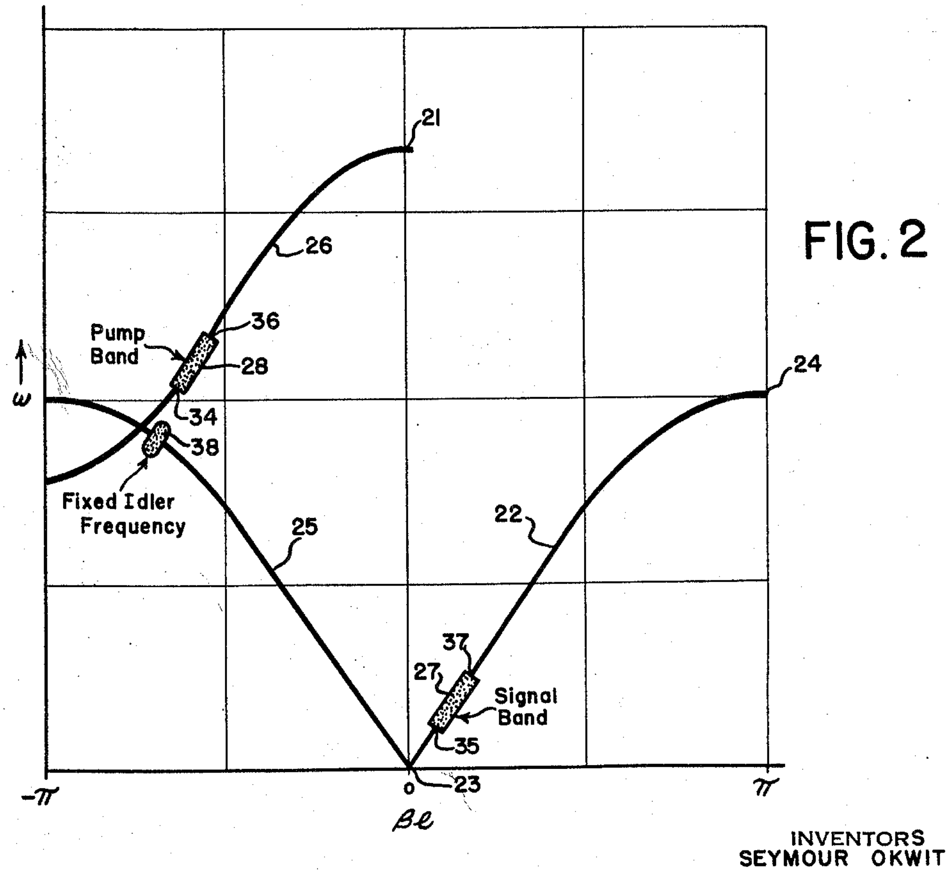
FIG. 2
INVENTORS
SEYMOUR OKWIT
MARTIN I. GRACE
BY
Pennie Edmonds Morton Barrows Taylor
ATTORNEYS

BACKWARD-WAVE PARAMETRIC AMPLIFIERS WITH WIDE-BAND TUNING

Filed Aug. 14, 1961 4 Sheets-Sheet 2

INVENTORS
SEYMOUR OKWIT
MARTIN I. GRACE
BY
Pennie Edmonds Morton Barrows & Taylor
ATTORNEYS

BACKWARD-WAVE PARAMETRIC AMPLIFIERS WITH WIDE-BAND TUNING

Filed Aug. 14, 1961 4 Sheets-Sheet 3

INVENTORS
SEYMOUR OKWIT
MARTIN I. GRACE
BY [signature]
ATTORNEYS

BACKWARD-WAVE PARAMETRIC AMPLIFIERS WITH WIDE-BAND TUNING

Filed Aug. 14, 1961 4 Sheets-Sheet 4

INVENTORS
SEYMOUR OKWIT
MARTIN I. GRACE
BY
ATTORNEYS

United States Patent Office 3,169,196
Patented Feb. 9, 1965

3,169,196
BACKWARD-WAVE PARAMETRIC AMPLIFIERS WITH WIDE-BAND TUNING
Seymour Okwit, Plainview, and Martin I. Grace, Flushing, N.Y., assignors to Cutler Hammer, Inc., Milwaukee, Wis., a corporation of Delaware
Filed Aug. 14, 1961, Ser. No. 131,400
10 Claims. (Cl. 307—88)

This invention relates to backward-wave parametric amplifiers.

Parametric amplifiers are now well known, and have been found useful because of their low noise properties. In general, such amplifiers have a variable reactance component whose reactance is varied at a pump frequency higher than the signal frequency, and a signal is applied to the variable reactance to obtain amplification thereof. Commonly variable capacitance semiconductor diodes are employed as the variable reactance, although a variable inductance is possible. The latter can be obtained through the use of a ferrite, for example.

In the functioning of a parametric amplifier, a frequency equal to the difference between the pump and signal frequencies is developed. This is often called the "idler" frequency. By employing a sufficiently high pump frequency, the idler frequency can be made substantially higher than the signal frequency, and this in general gives better noise performance as well as other advantages.

It is frequently desired to have a narrow passband receiver that is capable of being tuned across a wide input frequency band, and has a low noise figure. Backward-wave parametric amplifiers have been suggested for such purposes, but in known types the center frequency of the output passband varies as the amplifier is tuned. When used in a receiver of the superheterodyne type, this requires a complex demodulator or mixer following the amplifier to convert the variable amplifier output frequency to a fixed intermediate frequency. When used for other purposes, the variable output frequency may be disadvantageous due to the requirement for wideband circuits, etc.

The present invention is directed to a backward-wave parametric amplifier in which the center frequency of the output passband remains relatively constant as the amplifier is tuned over the input signal band. With suitable provision, the tuning can be accomplished by electronically varying the pump frequency.

In accordance with the invention, the pump and signal frequencies are applied to respective transmission lines which are coupled by a distributed variable reactance. When variable capacitance diodes are employed, a number of such diodes (or pairs of diodes) are distributed along the length of the transmission lines so as to provide the desired distributed coupling. The phase-propagation characteristics of the transmission lines are predetermined so that, as the pump frequency is varied to tune to different signal frequencies, the phase propagation constants of the pump and signal waves change in opposite directions so as to produce an idler frequency which is relatively constant and has a phase propagation constant equal to the difference between the pump and signal propagation constants.

In the specific embodiments described hereinafter the pump-frequency transmission line is designed as a backward-wave line, and as the idler frequency is developed it propagates in the signal-frequency transmission line but in a direction opposite to that of the signal. The two lines are designed so that their frequency-phase propagation characteristics have substantially the same absolute value of slope in their respective frequency bands, and yield a relatively constant idler frequency. The amplified output is then taken at the idler frequency.

In general, in order to obtain amplification in a backward-wave parametric amplifier, the following conditions must be met:

$$f_p = f_s + f_i \quad (1)$$

$$\beta_p = \beta_s + \beta_i \quad (2)$$

$$(V_g)_i \times (V_g)_s < 0 \quad (3)$$

In these equations the subscripts *p*, *s* and *i* refer to pump, signal and idler, respectively. Frequency is denoted *f* and $\beta$ is the phase propagation constant for the respective frequency. The phase propagation constants can be either positive or negative, and commonly $\beta$ refers to phase shift per unit length in a transmission line. The quantity $V_g$ is the group velocity of the frequency denoted by the subscript.

The two conditions set forth in the Equations 1 and 2 are the same as the conditions required for amplification in a traveling wave reactance amplifier. The third condition requires that the group velocities of the signal and idler be in opposite directions, so that one is negative to the other and makes the product less than zero.

The invention will be more fully understood by reference to the following description of specific embodiments thereof, wherein additional features and advantages will in part be pointed out and in part be obvious to those skilled in the art.

In the drawings:

FIGS. 1(*a*) and 1(*b*) illustrate one set of propagation relationships in accordance with the invention;

FIG. 2 is an $\omega$–$\beta$ diagram illustrating operation in accordance with the invention;

Figure 3:
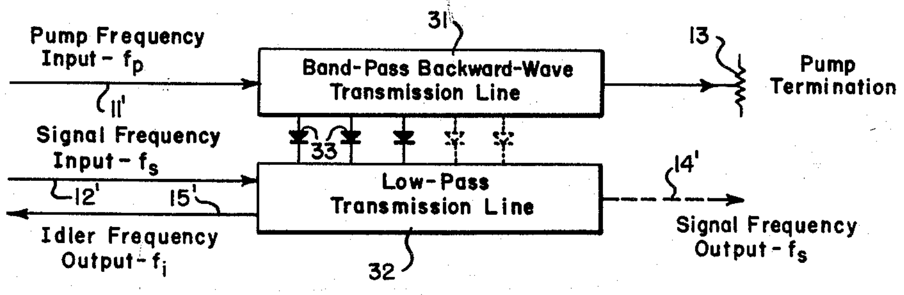
FIG. 3 is a block diagram of an amplifier in accordance with the invention.

Referring now to FIG. 1(*a*), block 10 denotes a backward wave parametric amplifier in accordance with the invention. Pump and input signal frequencies are applied to the amplifier through lines 11 and 12 respectively. At the other end of the amplifier a pump termination 13 is provided to prevent reflections of the pump frequency. An amplified output at the signal frequency is available as indicated by dotted line 14, but is normally not used. The amplified output normally used is at the idler frequency, and is supplied to subsequent circuits through line 15.

FIG. 1(*b*) gives the preferred combination of group and phase velocities utilized in the amplifier of the invention. The directions of the group velocity $V_g$ and phase velocity $V_f$ are given for signal, idler and pump frequencies. (To avoid confusion the subscript "*f*" is used for phase, since "*p*" is used for pump.)

It will be noted that the group and phase velocities of the signal frequency are in the same direction, thus indicating traveling-wave propagation. Similarly, the group and phase velocities of the idler frequency are in the same direction, indicating traveling-wave propagation. However, the group velocity of the idler frequency is in the opposite direction to that of the signal frequency, thus satisfying Equation 3. The group and phase velocities for the pump frequency are in opposite directions, thereby indicating backward-wave propagation.

Referring now to FIG. 2, an $\omega$–$\beta$ diagram is shown illustrating the design and operation of the transmission lines used in accordance with the invention. Diagrams of this type are increasingly used in the art since a great deal of information may be obtained therefrom. Since $\omega$ is equal to $2\pi f$, it is commonly referred to as angular frequency, or simply "frequency." The ratio of $\omega$ to $\beta$ at any point on a curve gives the phase velocity $V_f$. The slope of a curve at any point gives the group velocity $V_g$. If both $V_g$ and $V_f$ are of the same sign, there is traveling-wave propagation. If they are of opposite sign, there is backward-wave propagation. A zero slope such as at point 21 indicates no propagation, or a zero passband, hence indicating cutoff.

The horizontal coordinate is denoted $\beta l$, and is the phase shift per section of an artificial transmission line or an equivalent unit length of a distributed transmission line.

Curve 22 is a characteristic typical of a low passband transmission line or filter section. At zero frequency there is zero phase shift as shown at point 23. The curve rises linearly with frequency over a certain range, and then the slope decreases until it becomes zero at 24, thereby indicating cutoff. Below cutoff the slope is positive and the $\omega/\beta$ ratio positive, indicating traveling-wave propagation.

Curve 25 is also that of a low-pass filter and has the same shape as 22, but reversed from right to left. The slope is negative and $\omega/\beta$ negative, indicating traveling-wave propagation. As will be explained later, curves 22 and 25 are for the same low-pass transmission line, but represent wave propagation in opposite directions.

Curve 26 is characteristic of a band-pass transmission line designed as a backward-wave structure. Between the end points the slope is positive but $\omega/\beta$ is negative, indicating backward-wave propagation.

In drawing curves such as shown in FIG. 2, and in interpreting them, certain conventions must be established as to direction of velocity and direction of phase shift. Initially these may be arbitrarily established, but once established they should be followed consistently. The curves of FIG. 2 are drawn to agree with FIG. 1(*b*) wherein the arrows indicate positive velocity directions, and reference velocity and phase is with respect to the left-hand end of block 10 in FIG. 1(*a*).

An input signal band 27 is shown on curve 22. It will be noted that as the signal frequency increases, the phase shift also increases. Both group and phase velocities are positive. Hence, this corresponds to an input signal in line 12 of FIG. 1(*a*), and the velocities are as shown in FIG. 1(*b*).

Curve 26 corresponds to a band pass transmission line to which the pump frequency is supplied. The pump tuning range is indicated at 28. It will be observed that the group velocity (slope) is positive, agreeing with a pump input at line 11 of FIG. 1(*a*) and the group velocity arrow for the pump frequency in FIG. 1(*b*). However, the tuning range 28 lies in a region where the phase velocity is negative (since $\beta l$ is negative) corresponding to the direction of the phase velocity arrow in FIG. 1(*b*).

As shown in FIG. 1(*b*), the idler group velocity is to the left, and opposite to the signal group velocity. Also, the idler phase velocity is to the left. Accordingly, curve 25 represents this condition since both group and phase velocities are negative.

Referring now to FIG. 3, a band-pass backward-wave transmission line is indicated at 31. The pump frequency input is applied at 11', corresponding to 11 in FIG. 1(*a*). The other end of line 31 is provided with a pump termination 13 as already described.

A low-pass transmission line is indicated at 32, and the two lines are coupled by a number of variable capacitance diodes 33 distributed therealong. The number of diodes may vary with the particular application and hence some are shown dotted.

The signal frequency input is supplied through line 12' corresponding to 12 in FIG. 1(*a*), and the signal frequency output is available at line 14'. The idler frequency output is available at line 15'.

The two transmission lines are designed so that the absolute values of the slopes of the respective frequency-phase characteristics are substantially the same for the signal and pump frequency bands, and so that the difference between the pump and signal frequencies throughout the respective bands yields a substantially constant idler frequency having a phase propagation constant substantially equal to the difference of the pump and signal propagation constants throughout the tuning range. This will be explained with reference to FIG. 2.

In FIG. 2 it will be noted that the portions of curves 22 and 26 lying within the signal band 27 and the pump band 28 have the same slope. Accordingly, the difference between the lowest pump frequency 34 and the lowest signal frequency 35 will be equal to the difference between the highest pump frequency 36 and the highest signal frequency 37, these differences corresponding to a fixed idler frequency as shown at 38. The idler frequency 38 is shown as a narrow frequency band rather than just a point, for convenience of illustration and also to indicate that there is an appreciable although narrow bandwidth at the idler frequency.

Equations 1 and 2 set forth necessary relationships between frequency and phase for amplification. Thus, if amplification is to be obtained with a constant idler frequency, the difference between the pump and signal phase constants must remain constant. This will be an algebraic difference since the phase propagation constants in Equation 2 include sign as well as magnitude. This condition is met in FIG. 2 where it will be observed that as the pump and signal frequencies increase, the signal phase constant increases whereas the negative pump phase constant decreases, thereby shifting in compensating directions. For example, subtracting the phase of point 35 from that of point 34 yields the phase corresponding to point 38, and similarly if the phase of 37 is subtracted from that of 36.

These conditions can be met in practice by appropriate design of the band pass and low pass transmission lines. The manner in which a transmission line may be designed for a particular frequency-phase characteristic within a given frequency band is known in the art. In the present instance, the design of one filter is correlated with the design of the other to fulfill the conditions of Equations 1 and 2 over the desired tuning range.

Briefly, the design may start with a pair of equations representing the phase characteristics of the lines as a function of the frequency applied thereto, cutoff frequencies, and a filter constant in the case of the band-pass filter. Such equations are well known in the art. The equations may then be normalized as to their frequency terms and put in similar form for pump, signal and idler frequencies. Using Equation 2, a general solution can then be obtained for the filter constant. The desired tuning range may be introduced by using normalized expressions for the average pump and signal frequencies corresponding to the respective bandwidths, and substituting them in the general solution for the filter constant to obtain a solution satisfying the tuning conditions at midband.

The condition for equal slopes of the two transmission lines can be obtained by differentiating the respective phase equations, equating them, and solving for the filter constant in general terms. The tuning range requirement may then be introduced to obtain a solution for the filter constant satisfying the slope conditions at the respective midbands of the pump and signal tuning ranges.

The resultant two equations for filter constants satisfying midband phase and slope conditions may then be solved simultaneously to obtain a filter constant satisfying both requirements.

It is desirable for the frequency-phase characteristics to be as linear as possible in the pump and signal bands, in order to yield as constant an idler frequency as possible meeting the phase requirement. Some variation in the idler frequency is permissible in many applications. It is also desirable to have a high ratio of idler to signal frequency so as to improve the signal to noise ratio. For large tuning ranges it may be impractical to meet both objectives, and a suitable compromise may be made between tuning range, linearity and high idler frequency.

The design of filters to meet specified conditions is well known in the art, and further description is unnecessary.

Figure 4:
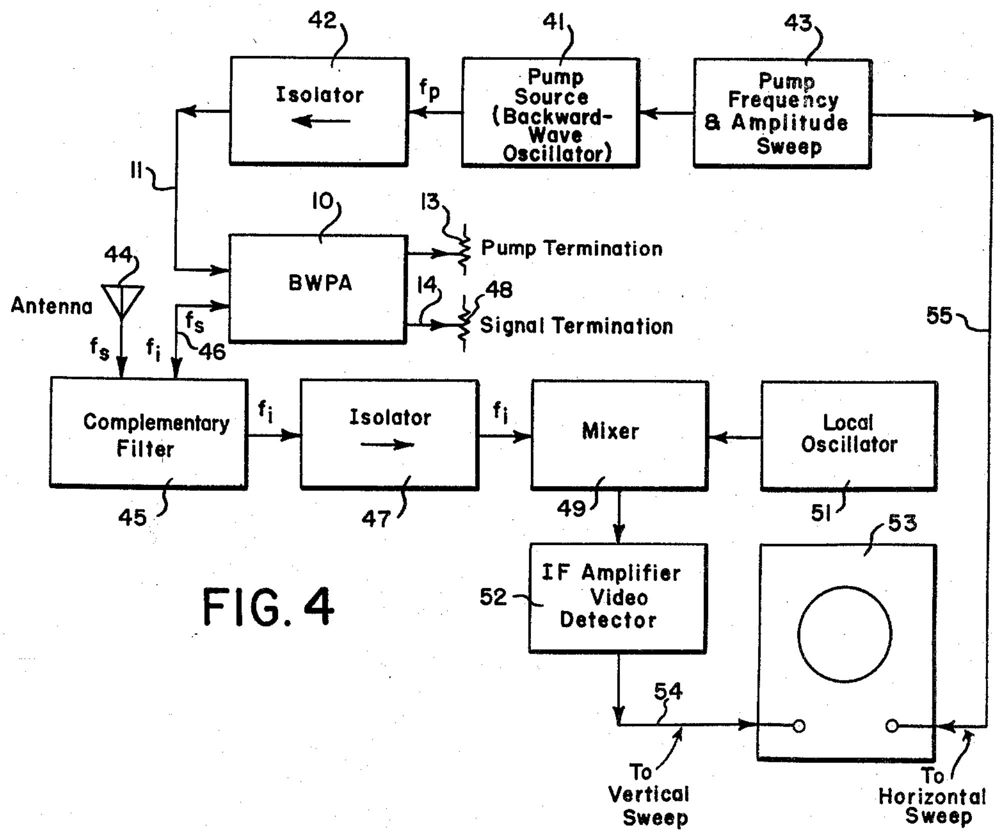
FIG. 4 is a block diagram of a superheterodyne receiver in which the amplifier of the invention is used.

FIG. 4 shows a search receiver utilizing the amplifier of the invention, and repeatedly sweeping across an input signal band. Amplifier 10 is shown as in FIG. 1(*a*). Pump frequency power is supplied from a pump source 41 through a unidirectional isolator 42 to amplifier 10. The pump source may be an oscillator of a type appropriate to the frequency range to be covered, and is designed so that its frequency can be changed over the desired band by a sweep from 43. As will be explained hereinafter, it is desirable to reduce the pump amplitude as the frequency increases, and the sweep from 43 may be used for this purpose also. For microwave use, backward-wave oscillators are known which can be controlled in frequency and amplitude as described, and may be employed.

Signals received at antenna 44 are supplied through complementary filter 45 and line 46 to amplifier 10. The output of the amplifier is taken at the idler frequency and is supplied through line 46 to filter 45. The filter functions to pass signal frequency energy from the antenna to the amplifier, but prevents the output at the idler frequency from reaching the antenna. It further functions to deliver the idler output frequency in line 46 to unidirectional isolator 47 while at the same time preventing signal frequency energy from reaching the isolator. A particular form of complementary filter for use at lower frequencies will be described in connection with FIG. 5. For microwave use, directional filters are known in the art which function in the manner described.

Amplifier 10 is provided with a pump termination 13 as already described. Inasmuch as the idler output frequency is utilized, the signal output frequency line 14 is terminated by a suitable load 48. However, it may be pointed out that the signal frequency output in line 14 can also be utilized if desired, while at the same time utilizing the idler frequency output as shown.

The receiver is of the superheterodyne type, and mixer 49 is supplied with the idler output frequency and also a local oscillator frequency from 51. Inasmuch as the idler output frequency is substantially constant, only a fixed frequency is required from the local oscillator. The output of mixer 49 is supplied to an I.-F. amplifier and video detector 52.

In this receiver a cathode ray oscilloscope 53 is used as a signal indicator. Accordingly, the detected output is supplied through line 54 to the oscilloscope, and deflects the oscilloscope beam in a vertical direction when a signal is received. The sweep from 43 is supplied through line 55 to deflect the oscilloscope beam horizontally so that the horizontal position of a signal serves as a measure of the signal frequency.

Inasmuch as the amplified signal is taken from amplifier 10 at the idler frequency and this frequency remains substantially constant as the receiver is tuned, the mixer 49 need function over only a narrow passaband centered around the idler frequency, with resultant simplicity and economy of design.

Figure 5:
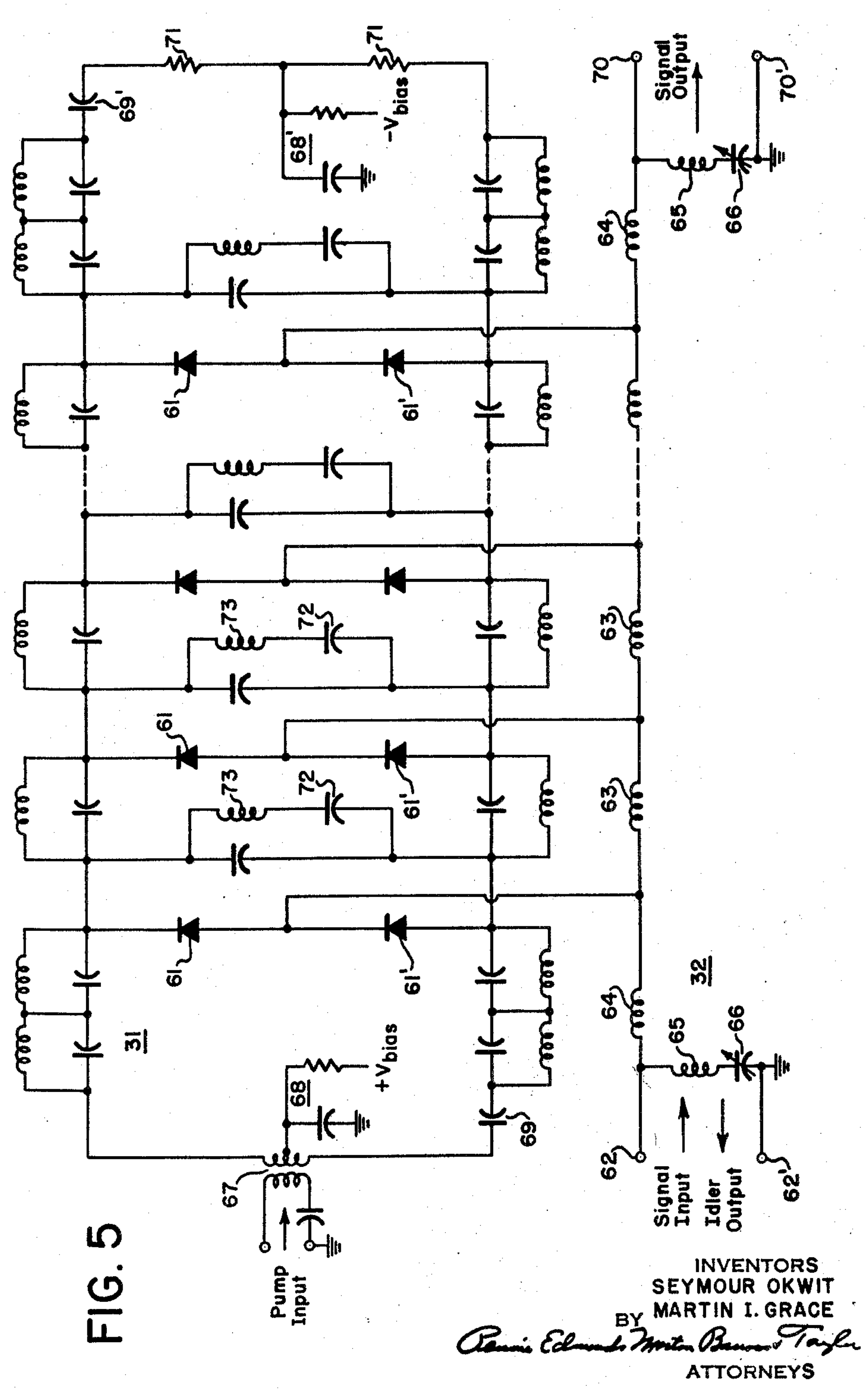
FIG. 5 is a schematic diagram of an amplifier using artificial transmission lines.

FIG. 5 shows a schematic diagram of a backward-wave parametric amplifier of the invention, designed for use at relatively low frequencies of the order of a few megacycles. Although parametric amplifiers are commonly used at much higher frequencies extending into the microwave region, lower frequency amplifiers are also useful and their design factilitates an understanding of the invention. The design of transmission lines useful in the microwave range, and functioning in a manner similar to those used in lower frequency ranges, will be understood by those skilled in the art.

In FIG. 5, the lower portion is a low-pass transmission line generally designated 32. The upper portion is a band-pass transmission line 31 designed as a backward-wave structure. These correspond to the blocks of FIG. 3. The distrtbuted non-linear reactance coupling is provided by pairs of diodes 61, 61′, in lieu of single diodes as shown in FIG. 3.

Considering first the low-pass transmission line in which signal and idler frequencies propagate, the signal input is applied at terminals 62, 62′, and the idler output is removed from the same terminals. The transmission line is formed essentially of a plurality of contant-*k* intermediate sections including inductances 63, with *m*-derived end sections including inductances 64, 65 and capacitors 66. The diodes 61, 61′ are essentially in parallel between the ends of inductances 63 and ground, and the capacitances thereof form the shunt capacitor elements of the constant-*k* sections. The cutoff frequency is selected to lie above the idler frequency, so that both signal and idler frequencies can propagate on the line. Advantageously, the cutoff frequency is below the pump frequency band so that the pump frequency cannot propagate along the low-pass line.

The band-pass transmission line 31 is a balanced line comprised of a plurality of intermediate sections with *m*-derived end sections. The diodes 61, 61′ of each pair are in series across each filter section, and form part of the shunt capacitances thereof. The pump frequency input is supplied to the transmission line through an impedance-matching transformer 67.

Normally, a fixed bias is desirable for the variable-capacitance diodes in order to establish proper operating points. The upper diodes 61 are provided with positive bias from a source denoted $+V_{bias}$ through a filter circuit 68. The inductances in the several filter sections at the top of the transmission line provide a D.-C. path for the bias. The capacitor 69 in the lower line prevents the application of the + bias to the lower diodes 61′. The latter are biased by a negative source denoted $-V_{bias}$ through a filter circuit 68′. This bias is supplied to the lower diodes 61′ through the inductances in the filter sections, but is blocked from the upper diodes 61 by capacitor 69′. Resistors 71 at the right end of the line provide a matched termination for the pump frequency. Capacitors 72 in series with inductances 73 in the shunt legs serve as blocking capacitors to avoid short-circuiting the diodes insofar as D.-C. bias is concerned, and are sufficiently large to have little reactance at the pump frequency.

As will be clear, the pump frequency is effective across each pair of diodes 61, 61′ so as to vary the capacitance thereof. Since these diodes are effectively in parallel across the sections of the low pass line 32, the varying capacitance will be effective on the signal frequency to produce reactance amplification thereof and also a corresponding idler frequency.

The design of the band pass line 31 and low pass line 32 is correlated as described above to provide a substantial fixed idler frequency having a fixed phase propagation constant as the pump frequency is varied to tune over the signal band. The particular configuration shown for the band-pass line 31 is well known. See for example "Reference Data for Engineers," 4th edition, I.T. & T., 1956, pp. 174–175. The phase shift per section can be expressed as $$\beta'_p = \cos^{-1}\left[\frac{1-\frac{2}{f_p^2-f_1^2}}{1+\frac{f_p^2-f_1^2}{m_1^2(f_2^2-f_p^2)}}\right] \qquad (4)$$

where $f_1$ and $f_2$ denote lower and upper cutoff frequencies respectively, and $m_1$ is the filter constant commonly employed in the design of such filters.

Similarly, the phase shift per section of the low-pass line 32 can be expressed as $$\beta'=2\sin^{-1}\left(\frac{f}{f_3}\right) \quad (5)$$

where $f_3$ is the cutoff frequency. The equation applies to either signal or idler frequencies by making $f$ equal $f_s$ or $f_i$, respectively, yielding two equations of the same form for $\beta'_s$ and $\beta'_i$.

Starting with these equations and using the procedures above-outlined, cutoff frequencies and a filter constant may be determined which satisfy the required conditions, and component values then computed.

Figure 6:
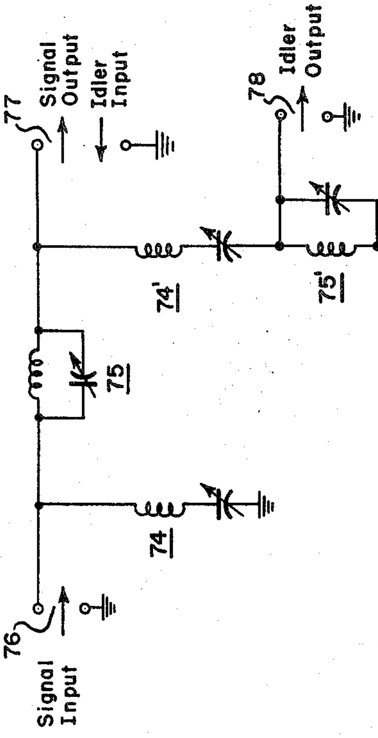
FIG. 6 is a schematic diagram of a complementary filter useable with the amplifier of FIG. 5.

Referring now to FIG. 6, a complementary filter is shown which can be used with the amplifier of FIG. 5 as illustrated at 45 in FIG. 4. The filter comprises series resonant L-C circuits 74, 74′ and shunt resonant L-C circuits 75, 75′. These resonant circuits are tuned to the idler frequency, which is above the signal frequency band. Circuits 74, 74′ will have a relatively high impedance and circuit 75 a relatively low impedance at the signal frequencies. Accordingly, a signal input at port 76 will pass through the filter to the output port 77. However, if there should be frequencies at input port 76 at or near the idler frequency, they will not pass to output port 77 due to the high impedance of 75 and the low impedance of 74 at the idler frequency.

The terminals of port 77 will be connected to terminals 62, 62′ of FIG. 5, and accordingly the signal will be supplied to the amplifier.

An idler frequency output from the amplifier will be an input at port 77, and consequently it may be termed the signal-idler port. Circuit 74′ will have a low impedance and circuit 75′ a high impedance at this frequency, thereby delivering an idler frequency output at the idler output port 78. Circuit 75 will have a high impedance and circuit 74′ a low impedance at the idler frequency, so that the idler frequency will not reach input port 76. Any reflected signal frequencies which might appear at the input terminals 62, 62′ of the parametric amplifier will not reach the idler output port 78 of FIG. 6, since circuit 74′ will have a high impedance and circuit 75′ a low impedance at the signal frequencies.

Circuits equivalent to that shown in FIG. 6 and useful at microwave frequencies are known in the art.

An important advantage of the combination of a directional filter with the amplifier of the invention lies in its relative immunity to interference by signals in the signal tuning range which differ somewhat from the signal to which the amplifier is tuned (that corresponding to the then-existing pump frequency).

Considering the combination of FIGS. 5 and 6, if the output is taken at the signal frequency (terminals 70, 70′) the maximum rejection of an interfering signal is equal to the gain of the amplifier plus the cold loss in line 32, say 20 db.

However, at the idler frequency the only signal that is propagating in the direction of the idler output port (terminals 62, 62′) is the backward-wave generated idler corresponding to the desired signal. This results in inherent rejection of undesired signals when the output is taken at the idler frequency. As above described, the complementary filter will prevent an undesired signal from reaching stages supplied with the idler output at port 78.

Thus the selectivity of the amplifier when the output is taken at the idler frequency is much superior to the selectivity obtained when the output is taken at the signal frequency.

It will also be noted that tuning is accomplished without encountering tracking problems commonly present when two or more circuits must be tuned simultaneously.

With the arrangement of FIGS. 5 and 6, a tuning range of over an octave has been obtained with a reasonably constant idler frequency, high gain and low noise temperature.

Figure 8:
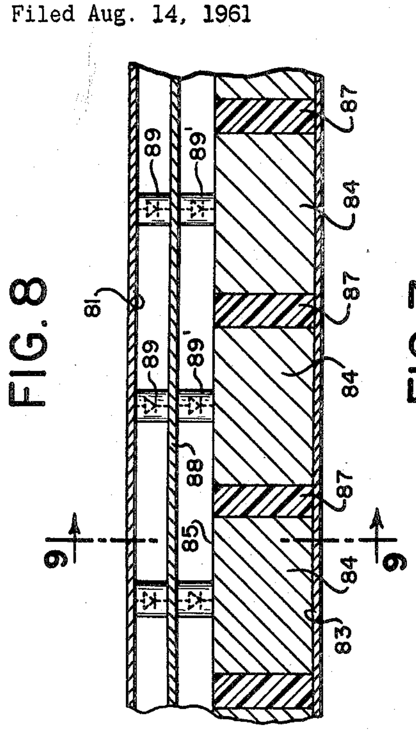
FIG. 8 is a longitudinal cross-section taken along the line 8—8 of FIG. 7.
Figures 7, 9:
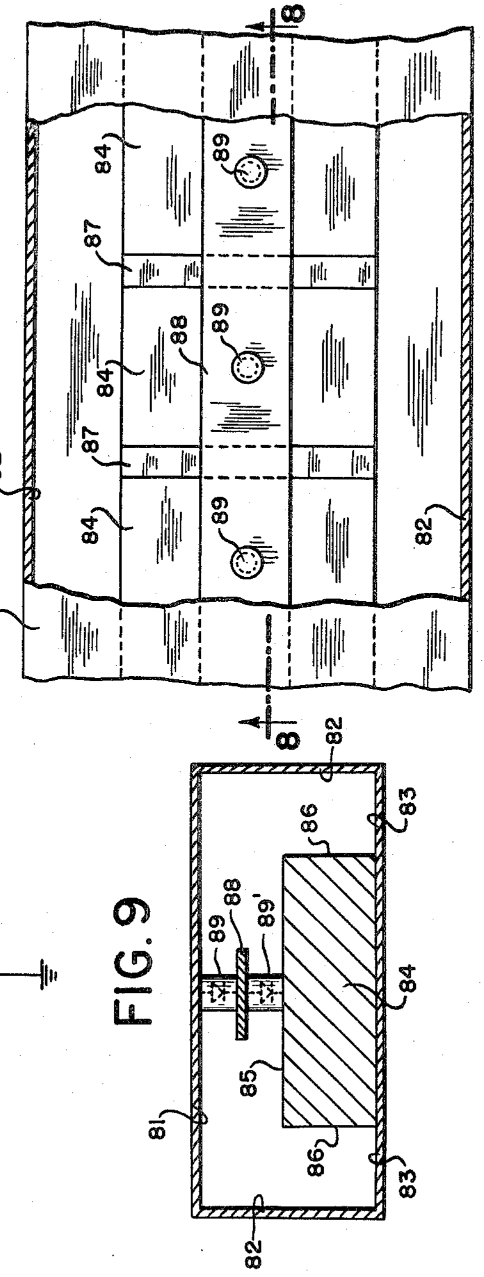
FIG. 7 is a plan view of a microwave transmission line arrangement, with a portion of the top broken away.
FIG. 9 is a lateral cross-section take along the line 9—9 of FIG. 8.

Referring now to FIGS. 7–9, a microwave transmission line structure is shown which is useful in the amplifier of the invention. This structure is a combination of a periodically ridged waveguide, with dielectric loading of the gaps, forming a band-pass transmission line having a backward-wave characteristic, together with a strip transmission line periodically loaded by the diode capacitances to form a low-pass transmission line.

Considering first the band-pass transmission line, the outer conductive walls are formed by a top wall 81, sidewalls 82 and bottom walls 83. The periodic ridge is formed by blocks 84 having conductive top surfaces 85 and side surfaces 86 forming the ridge sections. In the gaps between successive blocks 84 are spacers 87 of a low-loss material having a high dielectric constant.

Without the dielectric spacers, the periodically ridged waveguide would have a traveling wave characteristic, as is known in the art. The low-frequency cutoff determined by the dimensions of the waveguide may be considered to have a zero phase shift. The length of the ridge sections 84 is selected so as to resonate at a higher frequency, thereby giving a high-frequency cutoff with a phase shift of $\pi$. At the low-frequency cutoff, all the ridge elements 84 will be of the same sign, either positive or negative, at a given instant in time. Thus there will be a considerable concentration of the electric field between the tops 85 of the ridge sections and the top wall 81 of the outer member, with little or no electric field in the gaps between the ridge sections. On the other hand, at the high-frequency cutoff successive ridge sections 84 will be of opposite sign, resulting in a relatively large concentration of the electric field in the gaps and a relatively small concentration between the ridges and the outer conductor.

By introducing the dielectric spacers 87 in the gaps, the effective length of the individual ridge sections 84 is considerably increased, so that they may be caused to resonate at a frequency lower than that corresponding to zero phase shift. Thus the frequency corresponding to a phase shift of $\pi$ is below that corresponding to a zero phase shift, resulting in a backward-wave structure.

The low-pass transmission line is formed by a strip transmission line having a center conductor 88 placed midway between the upper surfaces 85 of the ridge sections and the top wall 81. Pairs of diodes 89, 89′ are positioned between the center conductor 88 and conductive walls 81, 85 at intervals as shown. The center conductor may be held in place by the diodes, or in any other suitable manner.

A strip transmission line normally transmits all frequencies up to a high value determined by losses, and is not considered to have a cutoff frequency. However, in the arrangement shown the line is periodically loaded by the capacitances of diodes 89, 89′, thus forming a low-pass structure.

As will be understood by those in the art, the center conductor 88 of the strip transmission line is located in an equipotential plane of the ridged waveguide. Consequently, it will have little or no effect on the ridged waveguide propagation characteristics.

As will be seen from the configuration, each pair of diodes 89, 89′ is effectively in parallel with respect to the strip transmission line, and in series with respect to the ridged transmission line. Thus, when a pump frequency is supplied to the ridged line to vary the diode capacitances, and a signal frequency is applied to the strip transmission line, reactance amplification of the signal frequency will occur and an idler frequency will be produced. The detailed design of the two transmission lines will be correlated as discussed in connection with FIG. 2 so as to obtain amplification at a relatively constant idler frequency and constant idler phase as the pump frequency is varied to tune across a desired input signal band.

As before mentioned, in the amplifier of the invention the variable reactance employed between the two transmission lines is distributed along the lines. In the specific embodiments, pairs of variable-capacitance diodes are employed. In a practical case, it is desirable to employ a minimum number of diodes consistent with high gain across the signal band.

The following equation is useful in this connection:

$$G=\frac{1}{\left(\frac{\Delta\beta^2}{\epsilon}+\cos^2\left(\frac{\epsilon L}{2}\right)\right)} \text{ (approx.)} \quad (6)$$

where $$\epsilon=\left(\frac{C_1}{C_0}\right)\sqrt{\beta_s\beta_i} \quad (7)$$

and $$\Delta\beta=|\beta_p-(\beta_s+\beta_i)| \quad (8)$$

As will be apparent, $\Delta\beta$ is the deviation from the optimum propagation constant condition of Equation 2. L is the length of the transmission line.

The quantity $C_1/C_0$ is a measure of the diode non-linearity. If the variation in diode capacitance as the pump power is increased is expressed as a Fourier series, $C_0$ is the average value or first term in the series, and $C_1$ is the coefficient of the second term. Higher order terms are usually neglected. For a given diode this ratio may be increased by increasing the amplitude of the pump frequency.

To achieve high gains the denominator of Equation 6 should be as small as possible consistent with stability. Hence $\Delta\beta$ should be small and $\epsilon L/2$ should approach $\pi/2$. Considering the latter condition, for high gain:

$$\epsilon L=L\left(\frac{C_1}{C_0}\right)\sqrt{\beta_s\cdot\beta_i}\rightarrow\pi \quad (9)$$

The arrow denotes that the expression should approach $\pi$ for high gain.

In the arrangement of FIG. 5, each filter section produces a given portion of the total phase shift, and a pair of diodes is effective for each filter section. In the arrangement of FIGS. 7–9, the total length of the transmission line can be considered to be divided into a number of sections corresponding to the number of pairs of diodes, each section contributing a given portion to the total phase shift. With the number of sections, or equivalent sections, denoted N:

$$N=\frac{\pi}{\left(\frac{C_1}{C_0}\right)\sqrt{\beta_s\cdot\beta_i}} \text{ (approx.)} \quad (10)$$

The idler phase propagation constant $\beta_i$ will be approximately constant, since the idler frequency is approximately constant. The signal phase propagation constant $\beta_s$ will vary with the signal frequency, and is a minimum at the low frequency end of the band. Consequently, this minimum value may be used in determining the number of diodes. For a given diode non-linearity characteristic, a given pump power, and given phase shifts per section, the required number of sections may be determined.

If the quantity $C_1/C_0$ remains constant as the receiver is tuned over the band, the gain will increase at the higher frequencies since $\beta_s$ will increase, as is apparent from Equations 6 and 7. To maintain a uniform gain over the band, the pump power output can be decreased as the pump frequency is increased to tune to a higher signal frequency is increased to tune to a higher signal frequency. Thus, the pump oscillator (such as 41 in FIG. 4) may be designed so that the sweep supplied thereto to vary the pump frequency simultaneously varies the output. Or, if the amplifier is arranged to be tuned manually, the output can be manually decreased as the pump frequency is increased. Oscillators are known in the art for various frequency bands which can be electronically tuned and the output varied electronically.

In the described embodiments the distributed variable-reactance coupling between the transmission lines is obtained by using discrete diodes or pairs of diodes spaced along the lines. With suitable variable-reactance materials the distributed coupling could be effected in a continuous manner, as for example by the use of ferrite material.

The invention has been described in connection with specific embodiments illustrating the preferred mode of operation. However, it will be understood by those skilled in the art that modifications may be made within the scope of the principles set forth.

We claim:

1. A backward-wave parametric amplifier which comprises a pair of transmission lines, distributed non-linear variable-reactance means coupling the transmission lines, and means for applying signal and pump frequencies in respective frequency bands to respective transmission lines to produce an idler frequency equal to the difference therebetween, said pump frequency being high compared to the signal frequency to produce an idler frequency which is higher than the signal frequency, said transmission lines having frequency-phase propagation characteristics producing an idler frequency group velocity opposite in direction to the signal frequency group velocity with the phase propagation constant at the idler frequency substantially equal to the algebraic difference of the phase propagation constants at the pump and signal frequencies, said frequency-phase propagation characteristics being predetermined to produce variations in the respective phase propagation constants which change in compensating directions in the respective signal and pump frequency bands to yield a substantially fixed idler phase propagation constant at an approximately fixed center frequency of the idler frequency passband.

2. A backward-wave parametric amplifier which comprises a pair of transmission lines, distributed non-linear variable-reactance means coupling the transmission lines, and means for applying signal and pump frequencies in respective frequency bands to respective transmission lines to produce an idler frequency equal to the difference therebetween, said pump frequency being high compared to the signal frequency to produce an idler frequency which is higher than the signal frequency, one of said transmission lines having a backward-wave propagation characteristic and the frequency-phase propagation characteristics of the pair of transmission lines being predetermined to produce an idler frequency group velocity opposite in direction to the signal frequency group velocity with the phase propagation constant at the idler frequency substantially equal to the algebraic difference of the phase propagation constants at the pump and signal frequencies, said frequency-phase propagation characteristics being predetermined to have substantially the same absolute value of slope in the respective signal and pump frequency bands with the respective phase propagation constants changing in compensating directions to yield a substantially fixed idler phase propagation constant at an approximately fixed center frequency of the idler frequency passband.

3. A backward-wave parametric amplifier which comprises a signal-frequency transmission line, a pump-frequency transmission line, distributed non-linear variable-reactance means coupling the transmission lines, means for applying signal and pump frequencies in respective frequency bands to respective transmission lines to produce an idler frequency equal to the difference therebetween propagating in the signal-frequency transmission line with a group velocity opposite to that of the signal frequency, said pump frequency being high compared to the signal frequency to produce an idler frequency which is higher than the signal frequency, said transmission lines having frequency-phase propagation characteristics predetermined to have substantially the same absolute value of slope in the respective signal and pump frequency bands and a phase propagation constant for an approximately fixed center frequency of the idler frequency passband which is substantially equal to the difference between pump and signal phase propagation constants throughout said bands.

4. A backward-wave parametric amplifier which comprises a signal-frequency transmission line having a traveling-wave propagation characteristic, a pump-frequency transmission line having a backward-wave propagation characteristic, distributed non-linear variable-reactance means coupling the transmission lines, means for applying signal and pump frequencies in respective frequency bands to respective transmission lines to produce an idler frequency equal to the difference therebetween propagating in the signal-frequency transmission line with a group velocity opposite to that of the signal frequency, said pump frequency being high compared to the signal frequency to produce an idler frequency which is higher than the signal frequency, said transmission lines having respective frequency-phase propagation characteristics predetermined to have substantially the same absolute value of slope in respective signal and pump frequency bands and yield an approximately fixed center frequency of the idler frequency passband having an idler phase propagation constant substantially equal to the difference between pump and signal phase propagation constants throughout said bands, and an output circuit connected to the signal-frequency transmission line to receive said idler frequency.

5. A backward-wave parametric amplifier which comprises a low-pass signal-frequency transmission line having a traveling-wave propagation characteristic, a band-pass pump-frequency transmission line having a backward-wave propagation characteristic, distributed non-linear variable-reactance means coupling the transmission lines, means for applying signal and pump frequencies in respective frequency bands to corresponding ends of the respective transmission lines to produce an idler frequency equal to the difference therebetween propagating in the signal-frequency transmission line with a group velocity opposite to that of the signal frequency, said pump frequency being high compared to the signal frequency to produce an idler frequency which is higher than the signal frequency, said transmission lines having respective frequency-phase characteristics predetermined to have respective phase propagation constants varying substantially linearly with frequency and of substantially the same absolute value of slope in respective signal and pump bands and yield a substantially fixed idler phase propagation constant equal to the difference between pump and signal phase propagation constants at a substantially fixed center frequency of the idler frequency passband, and an output circuit connected to the said end of the signal-frequency transmission line to receive said idler frequency.

6. A backward-wave parametric amplifier which comprises a low-pass signal-frequency transmission line having a traveling-wave propagation characteristic, a band-pass pump-frequency transmission line having a backward-wave propagation characteristic, distributed non-linear variable-reactance means coupling the transmission lines, means for applying signal and pump frequencies in respective frequency bands to corresponding ends of the respective transmission lines to produce an idler frequency equal to the difference therebetween propagating in the signal-frequency transmission line with a group of velocity opposite to that of the signal frequency, the pump frequency band being sufficiently higher than the signal frequency band to produce an idler frequency higher than the signal frequency band, said transmission lines having respective frequency-phase characteristics predetermined to have respective phase propagation constants varying substantially linearly with frequency and of substantially the same absolute value of slope in respective signal and pump bands and yield a substantially fixed idler phase propagation constant equal to the difference between pump and signal phase propagation constants at a substantially fixed center frequency of the idler frequency passband.

7. A backward-wave parametric amplifier which comprises a low-pass signal-frequency transmission line having a traveling-wave propagation characteristic, a band-pass pump-frequency transmission line having a backward-wave propagation characteristic, a plurality of non-linear variable-capacitance diodes coupling the transmission lines at spaced points therealong, means for applying signal and pump frequencies in respective frequency bands to corresponding ends of the respective transmission lines to produce an idler frequency equal to the difference therebetween propagating in the signal frequency transmission line with a group velocity opposite to that of the signal frequency, the pump frequency band being sufficiently higher than the signal frequency band to produce an idler frequency higher than the signal frequency band, the cutoff frequency of the low-pass transmission line lying above the idler frequency and below the pump frequency band, said transmission lines having respective frequency-phase characteristics predetermined to have respective phase propagation constants varying substantially linearly with frequency and of substantially the same absolute value of slope in respective signal and pump bands and yield a substantially fixed idler phase propagation constant equal to the difference between pump and signal phase propagation constants at a substantially fixed center frequency of the idler frequency passband, and an output circuit connected to the said end of the signal-frequency transmission line to receive said idler frequency.

8. Apparatus in accordance with claim 6 including a directional filter having a signal input port for receiving signals in the signal frequency band, a signal-idler port connected to the said end of the low-pass transmission line for supplying signals to the amplifier and receiving the idler frequency therefrom, and an idler output port; said filter including means for passing signals in the signal frequency band from the signal input port to the signal-idler port and for passing the idler frequency from the signal-idler port to the idler output port, and means for substantially preventing a signal at the idler frequency from passing from the signal input port to the idler output port.

9. Apparatus in accordance with claim 8 in which the directional filter includes means for substantially preventing a signal at the idler frequency from passing between the signal input port and the signal-idler port.

10. Apparatus in accordance with claim 6 including means for repeatedly sweeping the pump frequency over the pump frequency band to produce an idler frequency output corresponding successively to different signal frequencies in the signal frequency band.

References Cited in the file of this patent

Breitzer et al.: "Microwave Journal," August 1959, pages 34–37.

Boyet et al.: "Proceedings of the IRE," July 1960, pages 1331–1333.

Currie et al.: "Proceedings of the IRE," December 1960, pages 1960–1987.

Reed: "Semiconductor Products," February 1961, pages 35–42.

Fisher: "Proceedings of the IRE," July 1960, pages 1227–1232.